United States Patent
Wong et al.

(10) Patent No.: US 12,405,826 B2
(45) Date of Patent: Sep. 2, 2025

(54) RESERVATION MECHANISM FOR NODES WITH PHASE CONSTRAINTS

(71) Applicant: INTERNATIONAL BUSINESS MACHINES CORPORATION, Armonk, NY (US)

(72) Inventors: Brendan M. Wong, Beaumont, TX (US); Bradley Donald Bingham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 17/446,427

(22) Filed: Aug. 30, 2021

(65) Prior Publication Data

US 2023/0068740 A1    Mar. 2, 2023

(51) Int. Cl.
*G06F 9/50* (2006.01)
*G06F 13/368* (2006.01)
*H04L 12/427* (2006.01)

(52) U.S. Cl.
CPC .......... *G06F 9/5027* (2013.01); *G06F 13/368* (2013.01); *H04L 12/427* (2013.01)

(58) Field of Classification Search
CPC ................ G06F 9/5027; G06F 9/5011; G06F 2209/5014; G06F 13/368; H04L 12/40143;
(Continued)

(56) References Cited

U.S. PATENT DOCUMENTS

| | | |
|---|---|---|
| 4,907,224 A | 3/1990 | Scoles |
| 5,131,085 A | 7/1992 | Eikill |

(Continued)

FOREIGN PATENT DOCUMENTS

| | | |
|---|---|---|
| EP | 0465027 A2 | 1/1992 |
| WO | 9103898 A1 | 3/1991 |

(Continued)

OTHER PUBLICATIONS

Bianchi, Giuseppe & Bonola, Marco & Bruschi, Valerio & Petrucci, Luca & Pontarelli, S.. (2017). Implementing a Per-Flow Token Bucket Using Open Packet Processor. 251-262. 10.1007/978-3-319-67639-5_18, https://www.researchgate.net/publication/319489224_Implementing_a_Per-Flow_Token_Bucket_Using_Open_Packet_Processor.

(Continued)

*Primary Examiner* — Aimee Li
*Assistant Examiner* — Willy W Huaracha
(74) *Attorney, Agent, or Firm* — Eric W. Chesley (57) ABSTRACT

A computer chip, a method, and computer program product for providing phase reservations between processing nodes. A computer chip includes a plurality of processing nodes interconnected in an on-chip data transfer network configured in a circular topology. The processing nodes include reservation mechanisms managing reservations made by processing nodes with phase constraints. The reservation policy allows the processing nodes to make a reservation, for a given phase, in any phase window, only once per reservation window. A reservation window can be a bounded amount of time for when a node is guaranteed an opportunity to transmit at least one message. The reservation policy also prevents the processing nodes from making more than one reservation in a phase window. Once a reservation is granted, the corresponding message may progress on the bus unimpeded. Requestors attempting to transmit messages are blocked until the message is transmitted.

17 Claims, 4 Drawing Sheets

(58) Field of Classification Search
CPC ....... H04L 47/781; H04L 47/72; H04L 12/42; H04L 47/74; H04L 12/427
See application file for complete search history.

(56) References Cited

U.S. PATENT DOCUMENTS

| | | | |
|---|---|---|---|
| 5,185,737 | A | 2/1993 | Nassehi |
| 5,908,468 | A | 6/1999 | Hartmann |
| 5,953,510 | A | 9/1999 | Herzl |
| 6,516,368 | B1 | 2/2003 | Arimilli |
| 6,848,003 | B1 | 1/2005 | Arimilli |
| 7,493,417 | B2 | 2/2009 | Arimilli |
| 7,627,738 | B2 | 12/2009 | Chung |
| 7,650,076 | B2 | 1/2010 | Su |
| 7,747,771 | B1 | 6/2010 | Shah |
| 7,751,426 | B2 | 7/2010 | Hillyard |
| 7,870,337 | B2 | 1/2011 | Bell, Jr. |
| 8,560,776 | B2 | 10/2013 | Drapala |
| 9,178,827 | B2 | 11/2015 | Kaplan |
| 9,665,294 | B2 | 5/2017 | Povzner |
| 9,979,668 | B2 | 5/2018 | Chen |
| 10,496,333 | B2 | 12/2019 | Yang |
| 10,705,985 | B1 | 7/2020 | Pollak |
| 10,764,185 | B2 | 9/2020 | Marshall |
| 10,855,389 | B1 | 12/2020 | Roggendorf |
| 11,580,058 | B1* | 2/2023 | Marino ................ H04L 12/417 |
| 11,593,134 | B2 | 2/2023 | Wang |
| 2003/0033555 | A1 | 2/2003 | Joyner |
| 2003/0202530 | A1 | 10/2003 | Jenkins |
| 2003/0212812 | A1* | 11/2003 | Wang ................ H04J 14/0227 709/251 |
| 2004/0210696 | A1 | 10/2004 | Meyer |
| 2004/0230751 | A1 | 11/2004 | Blake |
| 2005/0080941 | A1 | 4/2005 | Moll |
| 2006/0045120 | A1* | 3/2006 | Mattina .................. H04L 12/43 370/460 |
| 2006/0104296 | A1* | 5/2006 | Rodrigo ................ H04L 45/44 370/403 |
| 2007/0297441 | A1* | 12/2007 | Heil ..................... H04L 12/423 370/403 |
| 2008/0034054 | A1* | 2/2008 | Stehley ............... H04L 67/1097 709/213 |
| 2008/0104245 | A1 | 5/2008 | Romero |
| 2008/0159176 | A1* | 7/2008 | Heil ................... H04L 12/4035 370/258 |
| 2009/0067428 | A1 | 3/2009 | Balandin |
| 2009/0252172 | A1* | 10/2009 | Hare ................... H04L 47/822 370/400 |
| 2009/0327651 | A1 | 12/2009 | Cargnoni |
| 2010/0095036 | A1* | 4/2010 | Mittal .................. G06F 13/366 710/117 |
| 2010/0299734 | A1 | 11/2010 | Lynch |
| 2012/0030448 | A1 | 2/2012 | Lieske |
| 2012/0089984 | A1 | 4/2012 | Adar |
| 2012/0102561 | A1 | 4/2012 | Butt |
| 2012/0159087 | A1 | 6/2012 | Cox |
| 2014/0082238 | A1 | 3/2014 | Ahmad |
| 2014/0185451 | A1 | 7/2014 | Yip |
| 2014/0233575 | A1* | 8/2014 | Xie ...................... H04L 45/44 370/400 |
| 2014/0280700 | A1 | 9/2014 | Maitland |
| 2014/0372646 | A1 | 12/2014 | Salisbury |
| 2015/0009906 | A1* | 1/2015 | Dore .................... H04L 5/0007 370/329 |
| 2015/0255126 | A1 | 9/2015 | Khwa |
| 2016/0070593 | A1 | 3/2016 | Harris |
| 2017/0099213 | A1* | 4/2017 | Bruckner ............... H04L 45/22 |
| 2018/0324827 | A1 | 11/2018 | Abraham |
| 2019/0018776 | A1 | 1/2019 | Sato |
| 2019/0042486 | A1 | 2/2019 | Guthrie |
| 2020/0042449 | A1 | 2/2020 | Marino |
| 2020/0279250 | A1 | 9/2020 | Good |
| 2020/0296083 | A1 | 9/2020 | Chennuri |
| 2021/0037544 | A1 | 2/2021 | Andrews |
| 2022/0308877 | A1 | 9/2022 | Maiyuran |
| 2022/0342542 | A1 | 10/2022 | Alkalay |
| 2023/0061266 | A1 | 3/2023 | Marino |
| 2023/0064969 | A1 | 3/2023 | Wong |
| 2023/0118362 | A1 | 4/2023 | Marino |

FOREIGN PATENT DOCUMENTS

| | | |
|---|---|---|
| WO | 2023031015 A1 | 3/2023 |
| WO | 2023031016 A1 | 3/2023 |

OTHER PUBLICATIONS

Chakrabarti, Ayan, Roch Gu'erin, Chenyang Lu and Jiangnan Liu. "Real-Time Edge Classification: Optimal Offloading under Token Bucket Constraints." ArXiv abs/2010.13737 (2020): n. pag., https://arxiv.org/abs/2010.13737.

Coté, E. A., & Manjikian, N. (2007). Implementation of coarse-grain coherence tracking support in ring-based multiprocessors. A thesis submitted to the Department of Electrical and Computer Engineering, Queen's University.

Disclosed Anonymously, "Fairness circuit for automic read-modify-write operations on multiprocessor systems," IP.com Electronic Publication Date: Nov. 6, 2018, IP.com Electronic Publication Date: Nov. 6, 2018, https://ip.com/IPCOM/000256121.

Disclosed Anonymously, "Reserved slots in PowerBus attached units for off-chip traffic to reduce link congestion due to retries," IP.com Electronic Publication Date: Jan. 30, 2015, IP.com No. IPCOM000240448D, https://priorart.ip.com/IPCOM/000240448.

Eynde, Jeremy Van Den. "Token Bucket-Based Throughput Constraining in Cross-Layer Schedulers." ArXiv.org, Nov. 27, 2019, arxiv.org/abs/1911.12079.

Itamar Elhanany and Dan Sadot, A Contention-Free Tbit/sec Packet-Switching Architecture for ATM over WDM Networks, IEICE Trans. Commun., vol. E83-B, No. 2 Feb. 2000, https://www.researchgate.net/publication/2824295_A_Contention-Free_Tbitsec_Packet-Switching_Architecture_for_ATM_over_WDM_Networks.

Li, F.. "Local and Global QoS-aware Token Bucket Parameters Determination for Traffic Conditioning in 3rd Generation Wireless Networks." (2002), http://citeseerx.ist.psu.edu/viewdoc/summary?doi=10.1.1.385.8754.

List of IBM Patents or Patent Applications Treated as Related.

M. Hamdi, "ORMA: a high-performance MAC protocol for fiber-optic LANs/MANs," in IEEE Communications Magazine, vol. 35, No. 3, pp. 110-119, Mar. 1997, doi: 10.1109/35.581315.

Marty, M. R., & Hill, M. D. (2006, December). Coherence ordering for ring-based chip multiprocessors. In 2006 39th Annual IEEE/ACM International Symposium on Microarchitecture (MICRO'06) (pp. 309-320). IEEE.

Orlando Moreira, Jacob Jan-David Mol, and Marco Bekooij. 2007. Online resource management in a multiprocessor with a network-on-chip. In <i>Proceedings of the 2007 ACM symposium on Applied computing</i> (<i>SAC '07</i>). Association for Computing Machinery, New York, NY, USA, 1557-1564. DOI:https://doi.org/10.1145/1244002.1244335.

Vranesic, Z. G., Brown, S., Stumm, M., Caranci, S., Grbic, A., Grindley, R., . . . & Srbljic, S. (1995). The NUMAchine multiprocessor. University of Toronto. Computer Systems Research Institute.

Y. Peng, Q. Liu and P. Varman, "Scalable QoS for Distributed Storage Clusters using Dynamic Token Allocation," 2019 35th Symposium on Mass Storage Systems and Technologies (MSST), 2019, pp. 14-27, doi: 10.1109/MSST.2019.00-19, https://ieeexplore.ieee.org/document/8890120.

PCT/EP2022/073700 Notification of Transmittal of International Search Report and the Written Opinion of the International Searching Authority or the Declaration. Mailed Feb. 2, 2023. 23 pgs.

List of IBM Patents or Patent Applications Treated as Related, signed Aug. 30, 2022 (2 pgs).

PCT/EP2022/073700 Form PC/ISA/206—Annex to Form PCT/ISA/206 Communication Relating to the Results of the Partial International Search. Mailed Nov. 30, 2022. 14 pages.

(56) References Cited

OTHER PUBLICATIONS

PCT/EP2022/073698. International Search Report and Written Opinion mailed Nov. 9, 2022.

* cited by examiner

RESERVATION MECHANISM FOR NODES WITH PHASE CONSTRAINTS

BACKGROUND

The present disclosure relates to semiconductor computer chips, and more specifically, to using an anti-starvation reservation mechanism to manage destination processing between processing nodes with phase-based arbitration constraints.

Computer chips can include multiple processing nodes capable of performing a plurality of functions. The computer chips can utilize a plurality of buses configured in a circular, or ring, topology to connect multiple processing nodes on a single computer chip. The buses create communication pathways to allow the processing nodes to form a networked system on a single chip.

The processing nodes are devices such as a processor, an input/output ("I/O") controller, a memory, or a hybrid of devices capable of performing various tasks. A processor can be a central processing unit ("CPU"), a floating-point unit ("FPU"), an I/O controller, and the like. A memory can be in the form of random-access memory ("RAM"), read-only memory ("ROM"), hybrid memory, active memory, and the like. Hybrids can be task-specific, like an application-specific integrated circuit ("ASIC") or task-general.

SUMMARY

Embodiments of the present disclosure include a computer chip comprising a data transfer network that provides an anti-starvation reservation mechanism for processing nodes with phase-based arbitration constraints. The computer chip includes a plurality of processing nodes interconnected in an on-chip data transfer network configured in a circular topology. The processing nodes include reservation mechanisms that manage reservations made by the processing nodes. The reservation mechanisms apply a reservation policy when a starvation condition is met on a processing node. The reservation policy allows the processing nodes to make a reservation for a given phase in any phase window only once per reservation window. A reservation window can be a bounded amount of time that a node is guaranteed an opportunity to transmit at least one message. A phase window can be a number of phases based on the most restrictive node in the network. The reservation policy also prevents the processing nodes from making more than one reservation in a phase window. Once a reservation is granted, the arbitration scheme provides for point-to-point messaging such that each message, once granted by the reservation, progresses on the bus unimpeded. Requestors attempting to transmit standard messages are blocked until the message is transmitted. As such, the reservation mechanisms ensure that nodes can transmit at least one message within a bounded amount of time thereby preventing node starvation.

Additional embodiments include a computer-implemented method of managing reservations between processing nodes with phased-based arbitration constraints. The computer-implemented method includes requesting, by a processing node, transmission of a message to a destination node. The processing node and the destination node are connected within a circular topology network. An arbiter can determine whether the processing node can send a message to a destination node based on the phased constraints of the destination node. The computer-implemented method also includes determining the processing node has met a starvation condition when attempting to transmit the message. When the starvation condition is met, the processing node makes a reservation request by placing a reservation onto a reservation bus of the network. The reservation request is managed by a reservation mechanism applying a reservation policy restricting reservations between processing nodes on the network. The computer-implemented method further includes observing, by the processing node, a return of the reservation on the reservation bus that is providing a slot for the message on a communication bus of the network. The computer-implemented method further includes transmitting the message to the destination processing node in the slot generated by the reservation. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to semiconductor computer chips, and more specifically, to using an anti-starvation reservation mechanism to manage destination processing between processing nodes with phase-based arbitration constraints. While the present disclosure is not necessarily limited to such applications, various aspects of the disclosure may be appreciated through a discussion of various examples using this context.

Computer Systems have traditionally comprised a system unit or housing, which comprises a plurality of electrical components comprising the computer system. A computer system typically includes a motherboard that is configured to hold the microprocessor and memory and the one or more busses used in the computer system. The motherboard typically comprises a plurality of computer chips or electrical components, including intelligent peripheral devices, bus controllers, processors, bus bridges, etc.

More recently, computer systems are evolving toward integration of functions into a handful of computer chips. This coincides with the ability of chipmakers to place an increasingly large number of transistors on a single chip. For example, chip manufacturers can currently place up to ten million transistors on a single integrated circuit or monolithic substrate. It is anticipated that chip makers will be able to place one billion transistors on a single chip within several years. Thus, computer systems are evolving toward comprising a handful of computer chips, where each computer chip includes a plurality of functions. Integrating a plurality of modules or functions on a single computer chip requires an improved data transfer chip architecture. Also, due to the shorter distances and tighter integration of components on a chip, new data transfer architectures and techniques are necessary to take advantage of this environment.

A network on a chip, or network-on-chip ("NoC"), is a network-based communications subsystem on an integrated circuit between modules, or processing nodes, in a system on a chip. NoCs can span synchronous and asynchronous clock domains, known as clock domain crossing, or use unlocked asynchronous logic. NoCs can also support globally asynchronous, locally synchronous electronics architectures, allowing each processor core or functional unit on the system-on-chip to have its clock domain.

The topology of the NoCs can determine the physical layout and connections between nodes and channels. The topology also dictates the number of hops a message travels and a hop's channel length. For example, a ring topology with four nodes. Since the topology determines the number of paths between nodes, it can affect the network's traffic distribution and potential conflicts when nodes transmit messages. Additionally, the topology may connect nodes of differing types. For example, the topology may include interconnections between processing cores, memory controllers, and other types of units all on the same chip and network.

However, limitations remain on processing nodes configured with phase-based arbitration constraints in a circular topology network. These networks can include global phase constraints that manage destination conflicts. The constraints can dictate that a source node is only permitted to transmit a message to a destination node on a cycle that matches the phase of the destination node. Each node can also include additional arbitration constraints that arbiters on nodes independently use to determine when the node gets to use the bus. Additionally, messages placed on the bus remain on the bus until they reach their destination. These messages go unblocked while pending message requests can be blocked. Thus, there is the potential for the processing nodes to become starved if they are unable to place a message on the bus within a bounded amount of time. As a result, processing on the network may slow when nodes remain starved beyond the acceptable amount of time.

Embodiments of the present disclosure may overcome the above, and other problems, by applying a reservation policy to nodes with phase-based arbitration constraints. The nodes can be in a circular topology interconnected and coupled together by a bus. Each node can have a reservation mechanism that enforces a reservation policy on their respective node. The reservation policy dictates that the processing nodes can make a reservation for a given phase in any phase window only once per reservation window. A reservation window can be a bounded amount of time for when a node is guaranteed an opportunity to transmit at least one message. A phase window can be a number of phases based on the most restrictive node in the network. For example, if the most restrictive node can only accept messages once every four cycles, then the phase window would be four phases in size. The reservation policy can also prevent the processing nodes from making more than one reservation in a phase window.

More specifically, embodiments of the present disclosure can manage node starvation by applying a reservation policy on reservation requests made by the processing nodes. Since a node can only send data to a particular destination based on the destination phase constraints, the node must assert reservations for that destination on the correct phase. Additionally, each node has the potential to have different destination restrictions, thereby creating situations where nodes only have certain valid cycles in which they can receive data. Without proper management, some source processing nodes may not be able to transmit a message to a destination if an upstream node transmits a message in an earlier cycle. As such, the disclosure presents restrictions that allow each node in a network to transmit a message to a destination node at least once in a reservation window.

In some embodiments, the computer chip includes processing nodes coupled to one or more buses in a circular, or ring, topology. The processing nodes route data from source processing nodes transmitting messages to destination processing nodes. The buses can include a communication bus to transmit messages and a reservation bus to take reservations that reserve message transfers between the processing nodes.

Figure 1:
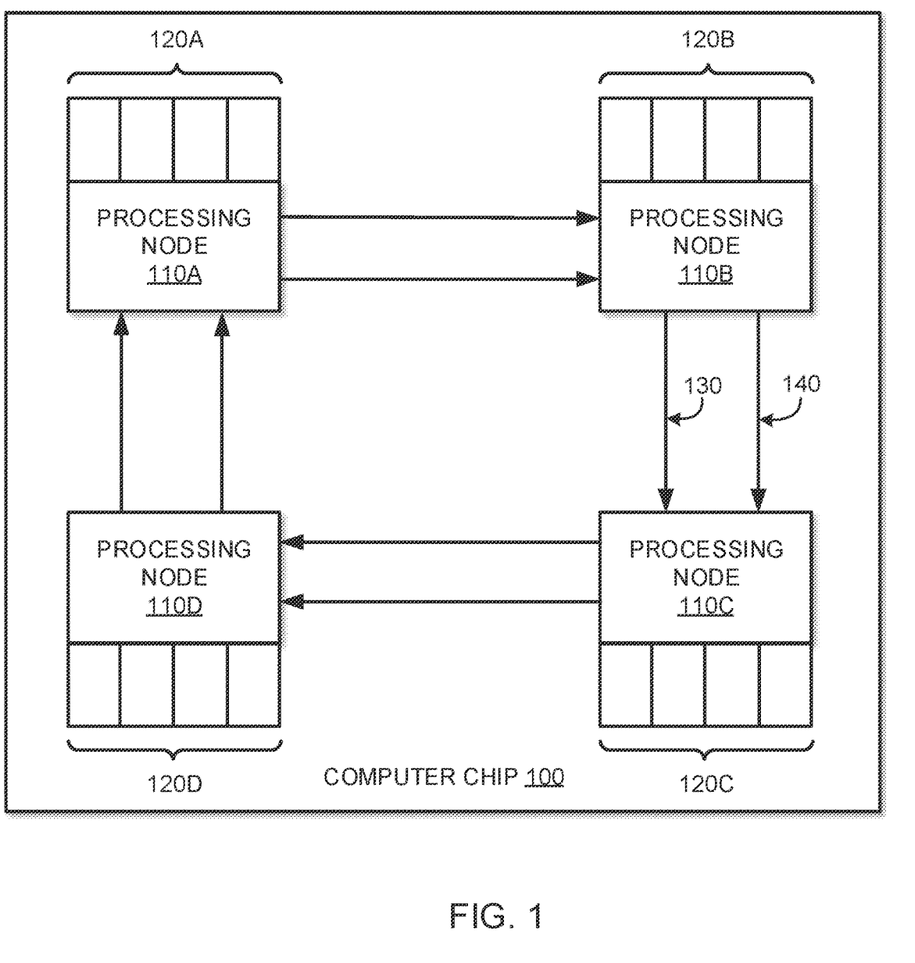
FIG. 1 is a block diagram illustrating a computer chip used by one or more embodiments of the present disclosure.

FIG. 1 illustrates a computer chip 100 configured to utilize a plurality of buses configured in a circular topology to interconnect multiple processing nodes 110A-110D on a single computer chip 100. The computer chip 100 also includes reservation mechanisms 120A-120D coupled to the processing nodes 110 for managing reservation requests between the processing nodes 110. When reference is made to a component and its associated number, such as processing node 110, that reference may refer to any of the components with that associated number, such as processing nodes 110A-110D, with or without an additionally associated letter. Each processing node 110 is connected via a communications bus 130 and a reservation bus 140, allowing for heterogeneous and homogenous processing node 110 types to form a networked system on the computer chip 100.

The communications bus 130 and the reservation bus 140 are components of the computer chip 100 configured to form part of a data transfer network utilizing multiple circular topologies for interconnecting the plurality of processing nodes 110A-110D on the computer chip 100 in an on-chip network. The communications bus 130 is further configured to provide an electrical path for data communications between the plurality of processing nodes 110 comprised on the computer chip 100. It is noted that although the embodiment of FIGS. 1 and 2 include two buses 130 and 140, a greater number of buses may be included, as desired.

The communication bus 130 and the reservation bus 140 may be unidirectional, that is, only transmitting data in one direction. The buses 130 and 140 may be also configured to transfer data in two directions. The buses 130 and 140 can also include addressing and control lines in addition to data lines. Other special function lines may also be included in buses 130 and 140 as desired. When a processing node 110 asserts a reservation, the reservation request will propagate in parallel with the communications bus 130 one-for-one with cycles that the communication bus 130 travels. The reservation forces a slot, or "bubble", onto the communications bus 130 blocking standard message transfers as it propagates around the network. When the slot gets back to the processing node 110 that made the reservation request, that processing node 110 can remove the reservation and insert a message in its place.

The processing nodes 110 are components of the computer chip 100 configured to perform operations. The processing nodes 110 can include, for example, a processor, an I/O controller, memory, or a hybrid of tasks (e.g., task-specific hybrid (ASIC) or task-general hybrid). A processor can be a CPU, FPU, or an I/O controller in any of the variety of possible forms. A memory can be a RAM, ROM, hybrid memory, or active memory in any of the variety of possible forms. Hybrids can be task-specific like an ASIC, or task general.

In some embodiments, the processing nodes 110 may be configured with a phase-based arbitration constraint. A phase-based arbitration constraint, or phase constraint, can restrict a processing node 110 into receiving messages only on certain phases as it relates to the total number of phases in a reservation window. Other phase constraints can also dictate that a processing node 110 can only receive data starting on an even (or odd) cycle. It should be noted that phase constraints can vary based on the configuration of a processing node 110. Each processing node 110 can have its own phase constraint that may be similar to, or different from, other processing nodes 110.

The reservation mechanisms 120 are components of the computer chip 100 configured to manage communication between the processing nodes 110. The reservation mechanisms 120 can provide a reservation policy on the processing nodes 110 that restricts reservation requests. Reservations force an empty slot in a cycle that propagates to the reserving processing node 110. Once the reservation propagates back to the reserving processing node 110, the processing node 110 can transmit its message to a destination processing node 110 without being blocked by other processing nodes 110. The reservation policy resets after the end of every reservation window, allowing the nodes another opportunity to transmit a message if starved.

The reservation policy are restrictions that allow each processing node 110, given their phase constraints, an opportunity to transmit a message within a reservation window. In some embodiments, the reservation window can be the number of processing nodes 110 in a network multipled by the number of phase windows. For example, a network with five processing nodes 110 with the most restrictive phase constraint being a node 110 that can only send a message one out of every four cycles. The number of phase windows would be four, thereby making the reservation window twenty cycles. In some embodiments, the reservation policy allows a processing node 110 to take only one reservation in a phase window. Take for instance, a phase window that is four cycles long. This reservation restriction only permits a processing node 110 to make a reservation in one of the four cycles. For example, if the processing node 110A makes a reservation in the first phase window at cycle '0', then it is restricted from making a reservation on cycle '1', '2', or '3' of the first phase window.

In some embodiments, the reservation policy includes a restriction that allows processing nodes 110 to transmit a reservation for a given phase in a phase window only once every reservation window. The number of phase windows can be predicated on the processing node 110 with the most restrictive phase constraint. Using the example described above, the processing node 110D has a 25% phase constraint. That phase constraint, being the most restrictive, generates four phase windows over the reservation window. The reservation window can be the number of valid cycles determined by multiplying the number of processing nodes 110 in the network by the number of phase windows. In this example, the reservation window would be sixteen cycles. As an example, if processing node 110A makes a reservation on cycle '0', it is prohibited from making a reservation on cycle '0' in the subsequent phase windows until the reservation window ends.

In the embodiment of FIG. 1, the computer chip 100 includes, moving in a clockwise fashion starting at the upper left, the processing nodes 110 coupled to the buses 130 and 140 in a circular topology. Each processing node 110 is further coupled to their corresponding reservation mechanism 120, collectively coupled to the buses 130 and 140 in a circular topology. It should be noted that other couplings for the processing nodes 110 are possible, such as another processing node 110 or to communication ports.

It is noted that FIG. 1 is intended to depict the major representative components of a computer chip 100. In some embodiments, however, individual components may have greater or lesser complexity than as represented in FIG. 1, components other than or in addition to those shown in FIG. 1 may be present, and the number, type, and configuration of such components may vary. While shown as only including four processing nodes 110, it should be noted that the computer chip 100 can include any number of processing nodes 110, configured in a circular topology.

To this point, it is assumed that L divides N, where N is the number of nodes and L is the least common multiple of the phase denominators. This guarantees that the phase when a reservation is sent is the same phase as it is received after making one lap. In cases where L does not divide N, the reservation is sent with the appropriate phase offset, such that it will arrive on the appropriate phase for the destination. This offset is S=L−R, where R is the remainder of N/L. For example, if N=5 and L=3, then R=2 and S=1. Note that sending a reservation on phase 0 arrives on phase 2, sending reservation on phase 1 arrives on phase 0, and sending a reservation on phase 2 arrives on phase 1. Instead of sending on phase X to arrive on phase X, the reservation is sent on phase X+S (mod L), while setting the reservation bit for X.

Figure 2:
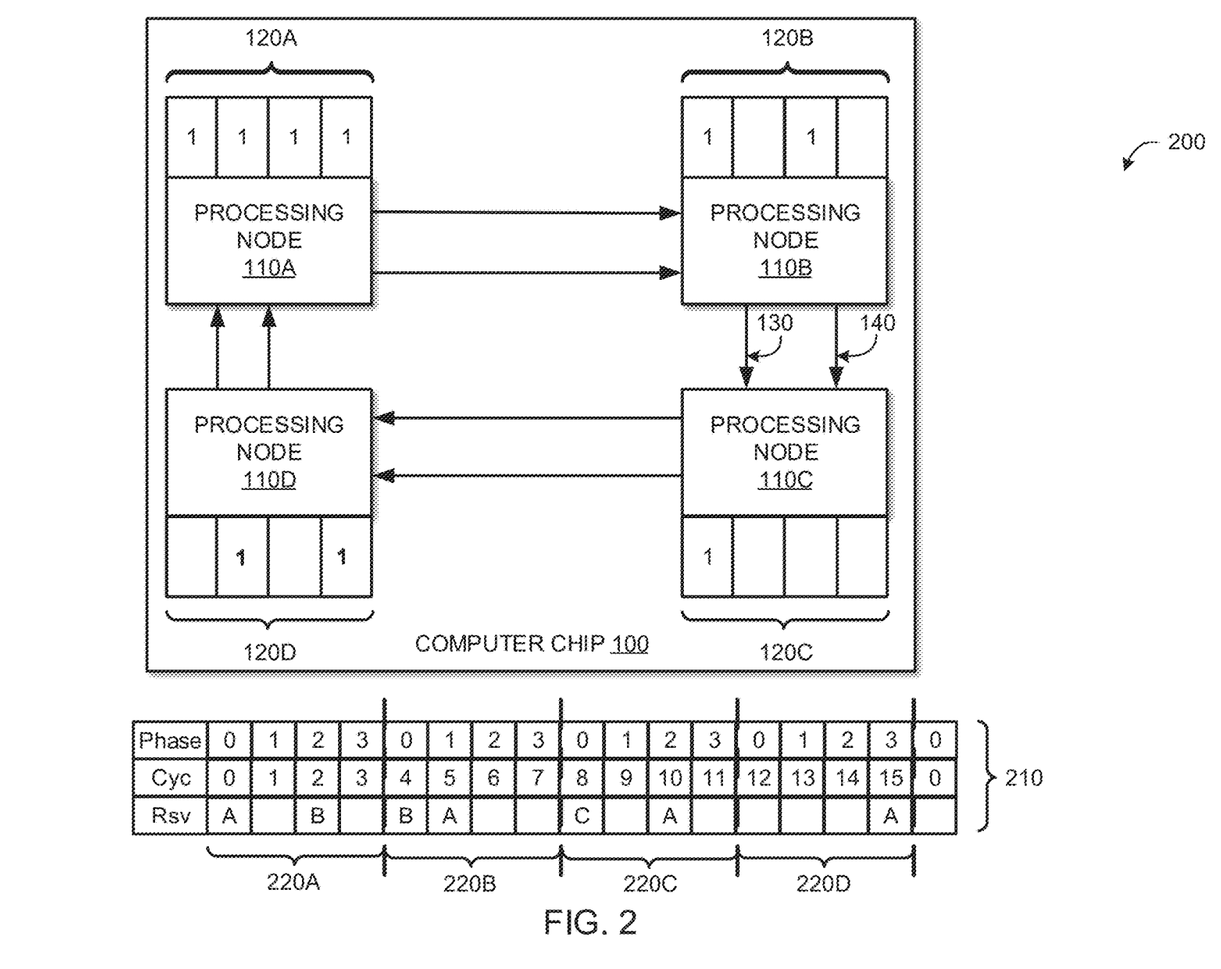
FIG. 2 is a block diagram illustrating a computer chip applying reservation restrictions on processing nodes with phase constraints and used by one or more embodiments of the present disclosure.

FIG. 2 is a block diagram illustrating an exemplary implementation 200 of a computer chip 100 utilizing a reservation policy imposed by the reservation mechanisms 120. Implementation 200 includes a table 210 illustrating the reservation process between the processing nodes 110 utilizing reservation policy imposed by the reservation mechanisms 120.

In this exemplary implementation 200, each processing node 110 has different phase constraints. In the example, and for illustrative purposes only, processing node 110A is an even unit that has a 50% phase constraint and can accept data starting at phase '0' making its valid phases as '0' and '2'. The processing node 110B is an even unit that has a 25% phase constraint and can accept data starting at phase '0' making its valid phase as '0' only. The processing node 110C is an odd unit that has a 50% phase constraint and can accept data starting at phase '1' making its valid phases as '1' and '3'. The processing node 110D is a 100% unit and can accept data on any phase making its valid phases as '0', '1', '2', and '3'.

Additionally, in this exemplary implementation, processing node 110B has the most restrictive phase constraint at 25% (i.e., ¼). Thus, it can only accept data once every four cycles making the phase windows 220A-220D four cycles long with four windows because it has the largest common denominator. When reference is made to a component and its associated number, such as phase window 220, that reference may refer to any of the components with that associated number, such as phase windows 220A-220D, with or without an additionally associated letter. The reservation window would be sixteen as there are four processing nodes 110 and four phase windows.

A processing node 110 can only send a reservation to a destination processing node 110 that matches the destination processing node's 110 phase constraint. If the destination processing node 110 is an even phase unit, then the source processing node 110 can only send reservations on even cycles, and so forth. It should be noted that FIG. 2 illustrates the reservation policy from the perspective of processing node 110A. Additionally, as shown, reservation indications in 120A-120D are shown after the fourth phase window, and prior to the reset that occurs at the end of the reservation window.

In the first phase window 220A, the processing node 110A transmits a reservation on cycle '0' to processing node 110D. When doing so, the reservation policy prevents the processing node 110A from transmitting another reservation in phase window 220A and prevents it from sending a reservation on cycle '0' in the reservation window. To indicate as such, processing node 110A marks its first slot '1' to illustrate that it can no longer transmit on cycle '0' in this reservation window. The processing node 110B transmits a reservation on cycle '2' for processing node 110D as well. The processing node 110B also has the same restrictions as the processing node 110A and marks the third slot '1' to reflect that it can no longer transmit on cycle '2' in this reservation window, nor can it transmit another reservation in the phase window 220A. Since processing node 110D is a 100% unit and can accept data on any cycle making both reservations permissible.

In the second phase window 220B, the processing node 110B transmits a reservation on cycle '0' to the processing node 110A. The reservation policy remains the same, and the processing node 110B marks the first slot '1' to reflect that it can no longer transmit on cycle '0' in this reservation window. Since the processing node 110A is an even unit, the reservation is permissible. The processing node 110A transmits a reservation on cycle '1' to the processing node 110D and also marks the second slot '1' to reflect that it can no longer transmit on cycle '1' in this reservation window.

In the third phase window 220C, the processing node 110C transmits a reservation on cycle '0' to the processing node 110B. The processing node 110C also marks the first slot '1' to reflect that it can no longer transmit on cycle '0' in this reservation window. Since the processing node 110B is a 25% unit and can only receive data on phase '0', this reservation is permissible. The processing node 110A transmits a reservation on cycle '2' to the processing node 110D. The processing node also marks the third slot '1' to indicate that it can no longer transmit on cycle '2' in this reservation window.

In the fourth phase window 220D, the processing node 110A transmits a reservation on cycle '3' to the processing node 110D. The processing nodes also mark the fourth slot '1' to reflect that it can no longer transmit on cycle '3' in this reservation window. The reservation window ends and all slots in the reservation mechanisms 120 are cleared and the processing nodes 110 restart the cycle of reservation policy.

Figure 3:
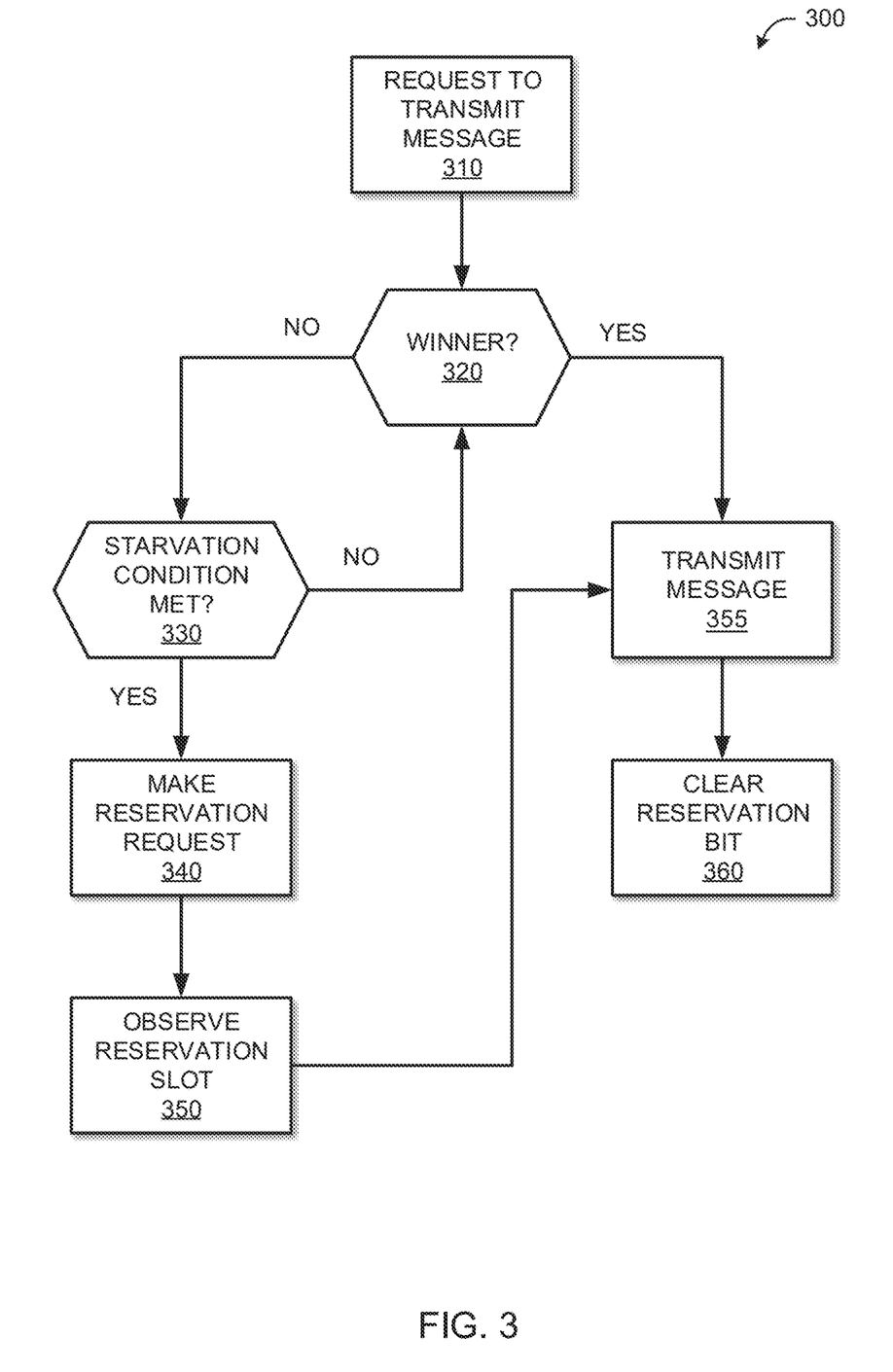
FIG. 3 is a flow diagram illustrating a process of managing reservations between processing nodes with phase-based arbitration constraints, in accordance with embodiments of the present disclosure.

FIG. 3 is a flow diagram illustrating a process 300 of managing destination conflicts between processing nodes configured in a ring topology, in accordance with embodiments of the present disclosure. The process 300 may be performed by hardware, firmware, software executing on a processor, or a combination thereof. For example, any or all the steps of the process 300 may be performed by one or more processors embedded in a computing device. A processing node 110 requests transmission of a message on the communication bus 130. This is illustrated at step 310. The processing node can be on a computer chip 100 configured with a plurality of buses and coupled to a plurality of processing nodes 110 with phase-based arbitration constraints. The processing node can also include a reservation mechanism 120 that manages a reservation policy providing an anti-starvation mechanism.

An arbiter within the processing node 110 determines whether the processing node 110 can send a message to a destination node 110 based on the phase constraints of the destination node 110. This is illustrated at step 320. If a slot is available, and the processing node 110 can send the message, the processing node 120 places the message on the communication bus 130 and the message is transmitted to the destination node 110. This is illustrated at step 355. However, if the arbiter prevents the processing node 110 from transmitting the message, the process 300 proceeds to step 330.

The arbiter determines whether a starvation condition is met. This is illustrated at step 330. A starvation condition can be a predetermined amount of time a processing node 110 is unable to transmit a message. If the starvation condition is not met, the processing node 110 continues to request transmission of its message to a destination node 100. However, if a starvation condition has been met, the process 300 proceeds to step 340.

The processing node 110 makes a reservation based on a reservation policy. This is illustrated at step 340. The reservation mechanisms 120 configure processing nodes 110 with a reservation policy. The processing node 110 can also mark the reservation request to indicate that the reservation has been made. The mark indicates that the processing node 110 made the reservation and can no longer transmit a reservation in the current phase window and that it can no longer transmit in that cycle for the remaining reservation window.

The reservation policy are restrictions that allow each processing node 110, given their phase constraints, an opportunity to transmit a message within a reservation window. A reservation window can be a bounded amount of time for when a node is guaranteed an opportunity to transmit at least one message. The reservation policy can also include a restriction that allows a processing node 110 to transmit a reservation for a given phase in a phase window only once every reservation window. The number of phase windows can be predicated on the processing node 110 with the most restrictive phase constraint.

The reservation policy can also allow a processing node 110 to take only one reservation in a phase window. Take for instance, a phase window that is four phases long. This arbitration restriction only permits a processing node 110 to make a reservation in one of the four phases.

The processing node 110 observes the reservation on the reservation bus 140. This is illustrated at step 350. The reservation has reserved a slot on the communication bus by blocking all other standard messages on the communication bus 130. The processing node 110 can remove the reservation and insert the message in its place. The processing node 110 can then transmit its message to a destination processing node 110 without being blocked by other processing nodes 110. This is illustrated at step 355. The processing node 110 removes the mark at the end of the reservation window. This is illustrated at step 360. The reservation policy resets at the end of the reservation window, thereby allowing the processing nodes 110 to make new reservations if needed.

Figure 4:
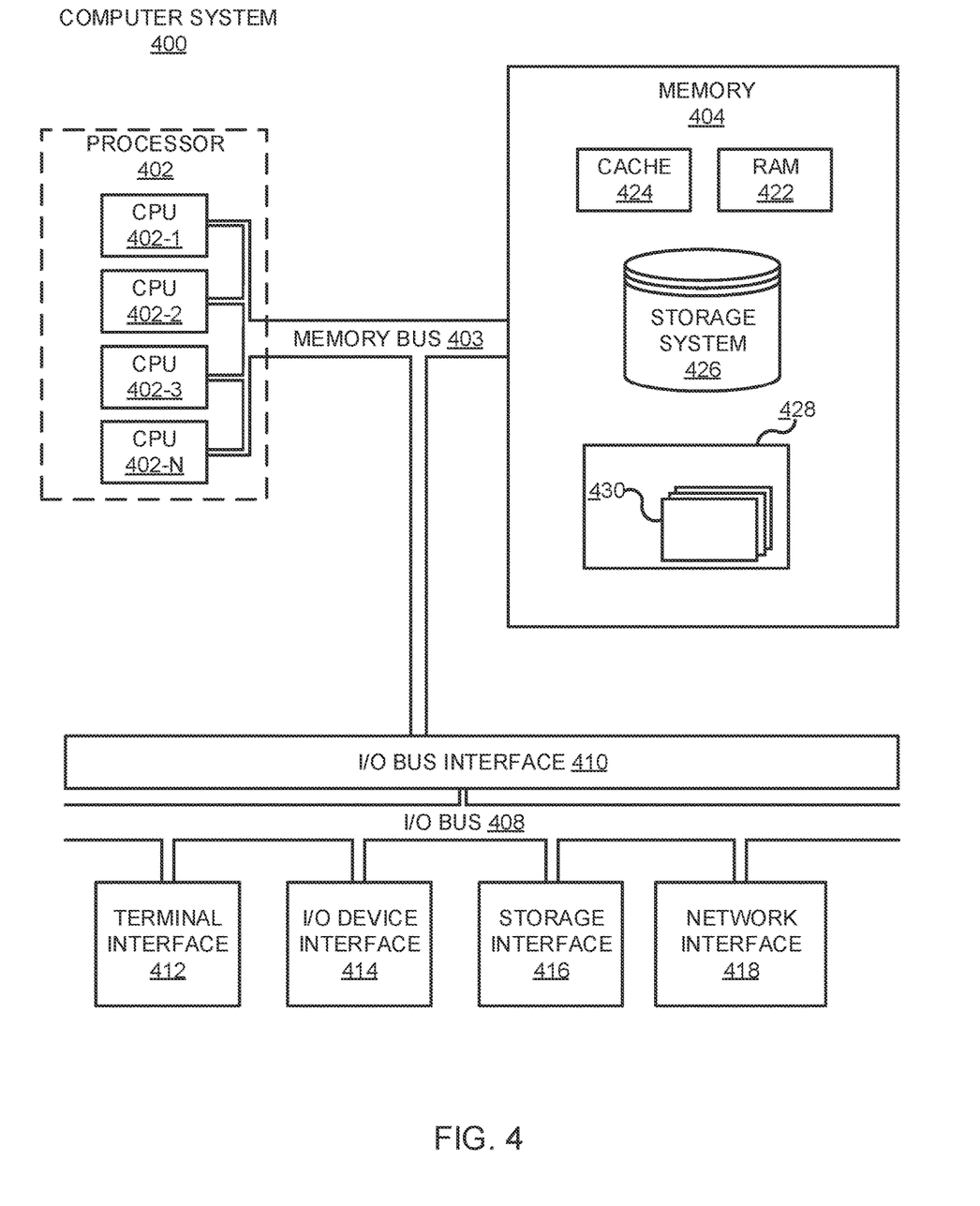
FIG. 4 is a high-level block diagram illustrating an example computer system that may be used in implementing one or more of the methods, tools, and modules, and any related functions, described herein in which the disclosure may be implemented.

Referring now to FIG. 4, shown is a high-level block diagram of an example computer system 400 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments, the computer system 400 may alternatively be a single CPU system. Each processor 402 may execute instructions stored in the memory 404 and may include one or more levels of onboard cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments, some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the computer chip 100), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer chip comprising a data transfer network, the data transfer network comprising:
   a plurality of buses configured on the computer chip, wherein the plurality of buses are configured in a circular topology network, wherein each bus of the plurality of buses provides a plurality of slots for transmission of information;
   a plurality of processing nodes, wherein each processing node of the plurality of processing nodes is coupled to the plurality of buses, wherein one or more source processing nodes of the plurality of processing nodes routes data to a destination processing node of the plurality of processing nodes according to phase-based arbitration constraints that regulate transmission of information on the plurality of buses to the destination processing node only on a cycle that matches a phase window in which the destination processing node is allowed to receive the information on the plurality of buses; and
   a plurality of reservation mechanisms, wherein each of the plurality of reservation mechanisms is coupled to a corresponding processing node of the plurality of processing nodes to manage reservations between the plurality of processing nodes that allow communication to occur between the plurality of processing nodes within a predetermined amount of time, wherein each of the plurality of reservation mechanisms applies on a corresponding processing node a reservation policy for transmitting information on a bus of the plurality of buses according to the phase-based arbitration constraints when a processing node satisfies a starvation condition, wherein the starvation condition is a predetermined amount of time the processing node is unable to transmit a message, wherein the reservation policy defines a reservation window having a number of cycles for transmitting information to the destination processing node, wherein the reservation window is determined in part by a most restrictive phase constraint of a processing node in the plurality of processing nodes, wherein the reservation policy resets at an end of the reservation window.

2. The computer chip of claim 1, wherein the reservation policy allows the plurality of processing nodes to make a reservation for a phase in a phase window only once in a reservation window.

3. The computer chip of claim 1, wherein the reservation provides a reserved slot on a bus of the plurality of buses by blocking other messages on the bus.

4. The computer chip of claim 1, wherein the reservation allows each processing node to request a reservation corresponding to a phase-policy based arbitration constraint of the processing node at least once in the reservation window.

5. The computer chip of claim 1, wherein the reservations reserve data transfer messages between the plurality of processing nodes.

6. The computer chip of claim 1, wherein the plurality of buses include a communications bus and a reservation bus.

7. The computer chip of claim 1, wherein the reservation mechanisms maintain a local state of previous reservations made within a reservation window to maintain adherence with the reservation policy.

8. A computer-implemented method of managing reservations between a plurality of processing nodes with phase-based arbitration constraints, where each processing node of the plurality of processing nodes includes an arbiter, the computer-implemented method comprising:
   requesting, by a source processing node of the plurality of processing nodes to an arbiter of the source processing node, transmission of a message from the source processing node of the plurality of processing nodes to a destination processing node of the plurality of processing nodes,
   wherein the source processing node and the destination processing node are connected within a circular topology network, wherein the circular topology network comprises a plurality of buses, wherein each bus of the plurality of buses provides a plurality of slots for transmission of information,
   wherein processing nodes of the plurality of processing nodes are configured with the phase-based arbitration constraints which regulate transmission of information on the plurality of buses to the destination processing node only on a cycle that matches a phase window in which the destination processing node is allowed to receive the information on the plurality of buses;

determining, by the arbiter in the source processing node, that the source processing node has met a starvation condition when requesting transmission of the message, wherein the starvation condition is a predetermined amount of time the source processing node is unable to transmit a message, wherein a reservation policy for transmitting information on a communication bus of the plurality of buses according to the phase-based arbitration constraints is applied to the plurality of processing nodes when a processing node satisfies the starvation condition, the reservation policy defining a reservation window having a number of cycles that is determined in part by a most restrictive phase constraint of a processing node in the plurality of processing nodes, and the reservation policy resets at an end of the reservation window;

placing, by the source processing node, a reservation for a given phase in a phase window onto a reservation bus of the plurality of buses, wherein the reservation adheres to the reservation policy restricting reservations between the plurality of processing nodes on the network, wherein the reservation is placed in a reserved slot allowed by the phase-based arbitration constraints of the destination processing node;

observing, by the source processing node, a return corresponding to the reservation on the reservation bus providing the reserved slot for the message on the communication bus of the plurality of buses; and transmitting, by the source processing node, the message to the destination processing node in the reserved slot generated by the reservation.

9. The computer-implemented method of claim 8, wherein the reservation policy allows the plurality processing nodes to make a reservation for a given phase in a phase window only once per a reservation window.

10. The computer-implemented method of claim 8, wherein the reservation provides a reserved slot on a bus of the plurality of buses by blocking other messages on the bus.

11. The computer-implemented method of claim 8, wherein the reservation policy allows each processing node to request a reservation that corresponds to a phase-based arbitration constraint of the processing node at least once in the reservation window.

12. The computer-implemented method of claim 8, wherein the source processing node maintains a local state of previous reservations made within a reservation window to maintain adherence with the reservation policy.

13. A computer program product including at least one computer readable storage medium having computer executable instructions for managing reservations between a plurality of processing nodes with phase-based arbitration constraints, where each processing node includes an arbiter, that when executed by at least one computer cause the at least one computer to execute the instructions to:

requesting, by a source processing node of a plurality of processing nodes to an arbiter of the source processing node, transmission of a message from the source processing node of the plurality of processing nodes to a destination processing node of the plurality of processing nodes, wherein the source processing node and the destination processing node are connected within a circular topology network, wherein circular topology network comprises a plurality of buses, wherein each bus of the plurality of buses provides a plurality of slots for transmission of information, wherein processing nodes of the plurality of processing nodes are configured with phase-based arbitration constraints that regulate transmission information on the plurality of buses to the destination processing node only on a cycle that matches a phase window in which the destination processing node is allowed to receive the information on the plurality of buses;

determining, by the arbiter in the processing node, that the source processing node has met a starvation condition when requesting transmission of the message, wherein the starvation condition is a predetermined amount of time the source processing node is unable to transmit a message, wherein a reservation policy for transmitting information on a communication bus of the plurality of buses according to the phase-based arbitration constraints is applied to the plurality of processing nodes when a processing node satisfies the starvation condition, the reservation policy defining a reservation window having a number of cycles that is determined in part by a most restrictive phase constraint of a processing node in the plurality of processing nodes, and the reservation policy resets at an end of the reservation window;

placing, by the source processing node, a reservation for a given phase in a phase window onto a reservation bus of the plurality of buses, wherein the reservation adheres to the reservation policy restricting reservations between the plurality of processing nodes on the network, wherein the reservation is placed in a reserved slot allowed by the phase-based arbitration constraints of the destination processing node;

observing, by the source processing node, a return corresponding to the reservation on the reservation bus providing the reserved slot for the message on the communication bus of the plurality of buses; and transmitting, by the source processing node, the message to the destination processing node in the reserved slot generated by the reservation.

14. The computer program product of claim 13, wherein the reservation policy allows the plurality processing nodes to request a reservation for a phase in a phase window only once per a reservation window.

15. The computer program product of claim 13, wherein the reservation provides a reserved slot on a bus of the plurality of buses by blocking other messages on the bus.

16. The computer program product of claim 13, wherein the reservation policy allows each processing node to request a reservation that corresponds to a phase-based arbitration constraint of the processing node at least once in the reservation window.

17. The computer program product of claim 13, wherein the source processing node maintains a local state of previous reservations made with the reservation policy.

* * * * *